United States Patent
Goers et al.

(10) Patent No.: US 11,255,455 B2
(45) Date of Patent: Feb. 22, 2022

(54) BISTABLE SOLENOID VALVE DEVICE, AND METHOD FOR MONITORING IT

(71) Applicant: WABCO EUROPE BVBA, Brussels (BE)

(72) Inventors: Andreas Goers, Pattensen (DE); Andreas Teichmann, Isernhagen (DE)

(73) Assignee: ZF CV SYSTEMS EUROPE BV, Brussels (BE)

( * ) Notice: Subject to any disclaimer, the term of this patent is extended or adjusted under 35 U.S.C. 154(b) by 250 days.

(21) Appl. No.: 16/485,070

(22) PCT Filed: Jan. 24, 2018

(86) PCT No.: PCT/EP2018/051746
§ 371 (c)(1),
(2) Date: Aug. 9, 2019

(87) PCT Pub. No.: WO2018/145904
PCT Pub. Date: Aug. 16, 2018

(65) Prior Publication Data
US 2020/0041023 A1  Feb. 6, 2020
US 2020/0400244 A9  Dec. 24, 2020

(30) Foreign Application Priority Data

Feb. 11, 2017 (DE) .......................... 102017001319.5

(51) Int. Cl.
*F16K 31/06* (2006.01)
*F16K 31/08* (2006.01)
(Continued)

(52) U.S. Cl.
CPC ...... *F16K 31/0627* (2013.01); *F16K 31/0606* (2013.01); *F16K 31/0679* (2013.01);
(Continued)

(58) Field of Classification Search
CPC ............ F16K 31/0627; F16K 31/0606; F16K 31/0679; F16K 31/082; F16K 37/0041;
(Continued)

(56) References Cited

U.S. PATENT DOCUMENTS 5,787,915 A * 8/1998 Byers .................. F15B 13/0442
137/1
6,957,655 B2 * 10/2005 Erickson .......... A61M 5/14216
137/1

FOREIGN PATENT DOCUMENTS

| DE | 102007016787 A1 | 10/2008 |
| DE | 102011081921 A1 | 2/2013 |
| EP | 3086334 A1 | 10/2016 |

OTHER PUBLICATIONS

English translation of International Search Report for PCT/EP2018/051746 dated May 8, 2018, 3 pages.
(Continued)

*Primary Examiner* — Eric Keasel
(74) *Attorney, Agent, or Firm* — Warner Norcross + Judd LLP (57) ABSTRACT

A bistable solenoid valve device for a fluid system is provided. The bistable solenoid valve device comprises a bistable solenoid valve. The bistable solenoid valve comprises a permanent magnet. The bistable solenoid valve further comprises an armature displaceable between a first armature position and a second armature position. The bistable solenoid valve further comprises a first switching coil for energization for a displacement of the armature into the first armature position. The bistable solenoid valve further comprises a second switching coil for energization for a displacement of the armature into the second armature position. The bistable solenoid valve further comprises an evaluation device adapted to measure an induced coil voltage, an induced coil current, or both the induced coil voltage and the induced coil current, at one or more of the non-energized switching coils. The evaluation device is further adapted to assess a switching behavior of the armature.

18 Claims, 4 Drawing Sheets

(51) Int. Cl.
    *F16K 37/00*     (2006.01)
    *H01F 7/16*      (2006.01)
    *H01F 7/18*      (2006.01)

(52) U.S. Cl.
    CPC ........ *F16K 31/082* (2013.01); *F16K 37/0041* (2013.01); *H01F 7/1615* (2013.01); *H01F 7/1844* (2013.01); *H01F 7/1872* (2013.01); H01F 2007/1669 (2013.01); H01F 2007/1692 (2013.01)

(58) Field of Classification Search
    CPC .... H01F 7/1615; H01F 7/1844; H01F 7/1872; H01F 2007/1669; H01F 2007/1692
    See application file for complete search history.

(56) References Cited

OTHER PUBLICATIONS

Machine assisted English translation of DE102007016787A1 obtained from https://patents.google.com on Aug. 7, 2019, 11 pages.
Machine assisted English translation of DE102011081921A1 obtained from https://patents.google.com on Aug. 9, 2019, 7 pages.
Machine assisted English translation of EP3086334A1 obtained from https://patents.google.com on Aug. 7, 2019, 15 pages.

\* cited by examiner

BISTABLE SOLENOID VALVE DEVICE, AND METHOD FOR MONITORING IT

CROSS-REFERENCE TO RELATED APPLICATIONS

This application is a national phase entry of PCT/EP2018/051746, filed Jan. 24, 2018, which claims priority to German Patent Application No. 10 2017 001 319.5, filed Feb. 11, 2017, both of which are incorporated herein by reference in their entirety.

FIELD OF THE DISCLOSURE

The disclosure relates to a bistable solenoid valve device for a fluid system, which may be, in certain embodiments, a compressed-air system of a commercial vehicle, and to a method for monitoring such a bistable solenoid valve device.

BACKGROUND

Bistable solenoid valves are used in a fluid system, for example a parking brake of a compressed-air system of a commercial vehicle, and make possible displacement between two valve positions, which can both be held in the currentless state of the solenoid valve. An end stage is provided for actuation, a control device is provided for actuating the bistable solenoid valve and, where necessary, further components are provided. The solenoid valve and further components therefore form the solenoid valve device.

The bistable solenoid valve generally has a permanent magnet and an armature that can be displaced relative to the permanent magnet, which in each case forms a magnetic circuit or permanent magnetic circuit on both sides, which holds the armature in the respective armature position. To this end, in particular, a yoke can be provided, which forms the magnetic circuit together with a first and second core, the armature, and the permanent magnet. The armature bears in its armature positions in each case against one of the two iron cores directly or without an air gap, with the result that a high magnetic flux density (a strong magnetic field) is formed. With respect to the other core, an air gap is formed, which weakens the other iron core.

The switchover processes between the armature positions are performed by a first and second switching coil, which may be formed, for example, so as to be stationary and in the yoke, but also, for example, as armature coils on the movable armature. For the switchover processes, a voltage pulse is given by employing a voltage ramp or as a square-wave signal to the respective switching coil so that a first or second electromagnetic field of the permanent magnet formation is superposed and displaces the armature into the respective other armature position, wherein the respective other switching coil remains with no current.

Beyond the switching processes, that is to say without applying a switching current, the armature therefore generally remains in the respective armature position thereof. On account, for example, of a mechanical shock, however, the armature can be displaced, in principle, when the magnetic holding force is overpowered and the armature is displaced into the other armature position, which is in turn held automatically.

In principle, reliable displacement processes are possible owing to the current pulses. However, on account of soiling, such as abrasion and wear, for example, accumulation or friction on the armature can arise, which threatens the reliable armature displacement. Sudden mechanical tremors occurring during the switching process can also threaten the mechanical displacement of the armature.

The disclosure is based on the object of providing a solenoid valve device and a method for monitoring same that ensure reliable operation.

BRIEF SUMMARY

A bistable solenoid valve device for a fluid system is provided. The bistable solenoid valve device comprises a bistable solenoid valve. The bistable solenoid valve comprises a permanent magnet. The bistable solenoid valve further comprises an armature displaceable between a first armature position and a second armature position. The bistable solenoid valve further comprises a first switching coil for energization for a displacement of the armature into the first armature position. The bistable solenoid valve further comprises a second switching coil for energization for a displacement of the armature into the second armature position. The bistable solenoid valve further comprises an evaluation device adapted to measure an induced coil voltage, an induced coil current, or both the induced coil voltage and the induced coil current, at one or more of the non-energized switching coils. The evaluation device is further adapted to assess a switching behavior of the armature.

A method for monitoring a bistable solenoid valve device is also provided. The bistable solenoid valve device comprises an armature. The bistable solenoid valve device further comprises a first switching coil and a second switching coil for switching the armature into a first armature position or second armature position. The method comprises actuating a control device for a first switching process into the first armature position to output a first switching signal wherein the second switching coil has zero current. The method further comprises actuating the control device for a second switching process into the second armature position, to output a second switching signal for energizing a second switching coil wherein the first switching coil has zero current. In a quiescent mode, the two switching coils are not energized. The method further comprises monitoring, in each case, in a switching process, in the quiescent mode, or both the switching process and the quiescent mode, at least one non-energized switching coil for an induced coil current or induced coil voltage. The method further comprises determining from the monitoring step whether there is a switching process present.

BRIEF DESCRIPTION OF THE DRAWING

The invention is described in greater detail below with reference to the accompanying figures, in which.

DETAILED DESCRIPTION

With reference to the specific embodiment of the figures, wherein like numerals generally indicate like parts throughout the several views, a bistable solenoid valve device and a method for monitoring a bistable solenoid valve device are provided herein. In this case, an electropneumatic hand brake comprising such a solenoid valve device is additionally provided in certain embodiments.

As contemplated herein, an induced coil voltage and/or an induced coil current in a non-energized switching coil is therefore measured and assessed. In this case, it is identified that the switching behavior of the armature can be monitored by employing the non-energized coil since the displacement of the armature or switching of the armature induces a current and/or voltage in the non-energized coil.

In various embodiments, the switching behavior can be monitored both during an intentional switching process, that is to say for a correct switching process, and can be monitored during a—non-energized—quiescent mode for the correct absence of a switching process.

As contemplated herein, in certain embodiments, it is identified here that in principle two physical effects that can lead to the induction of a voltage in the non-energized coil.

The transformer effect is effected by the actively switching switching coil, which directly generates a voltage in the non-switching (passive) switching coil. The bistable solenoid valve with its switching coils and the magnetic circuit therefore acts like a transformer: the energized switching coil generates a temporally changing magnetic flux, which in turn induces a voltage in the non-energized switching coil.

The generator effect is based on the fact that the armature is magnetized and therefore the displacement of the armature relative to the coil arrangement or the magnetic circuit induces a voltage. In this case, the magnetized armature is generally held in an armature clearance in the switching coils so that the armature is moved through the switching coils so that a voltage is induced directly in the surrounding switching coils. When the switching coil is not energized, the induced voltage can be read out directly.

By virtue of an induced electrical behavior of the non-energized switching coil therefore being monitored, the switching behavior can be induced without additional means or devices in the magnetic circuit or the solenoid valve. Therefore, an induced voltage an induced current can subsequently be recorded and evaluated by an evaluation device without a direct increased outlay in terms of apparatus in the solenoid valve device being necessary.

As contemplated herein, it is therefore also identified, in various embodiments, that it is not necessary to examine the coil current that switches or to monitor the armature movement by way of additional sensors etc., since the induced electrical behaviour already makes it possible to draw sufficient conclusions about the movement of the armature.

By virtue of the displacement of the armature therefore being monitored, faults or dangerous situations can be monitored as early as upon them occurring, before a disruption or danger arises due to the fully executed displacement of the armature, that is to say, in certain embodiments, an undesired armature displacement or else the non-displacement in the case of a desired displacement process. Therefore, advantages over, for example, a separate detection of the armature position are made possible; the detection of the armature displacement or armature movement makes possible a rapid reaction to a possibly safety-relevant fault, for example a release of an engaged hand brake or the undesired engagement of a hand brake or parking brake during travel, before the final displacement is achieved.

During switchover monitoring when the ignition is switched on, monitoring takes place to determine whether a displacement of the armature position has actually taken place when the voltage pulse of the switching voltage is applied. Therefore, the non-energized coil can serve for sensing. A negative pulse is achieved in the non-energized sensing switching coil through both the transformer effect and the generator effect, which together can generate a relatively high negative voltage.

Reliable checking of the correct switching process is therefore already made possible.

The induced coil voltages or coil currents can be recorded and transmitted to the evaluation device by employing a suitable functional circuit for operating point setting and/or potential isolation and/or current limitation. Since the vehicle electronic system or the control device and evaluation device of the end stage or the solenoid valve device is generally supplied with a positive on-board voltage, a functional circuit, for example a voltage divider circuit, which superposes a positive bias voltage on the induced negative voltage pulse, may be provided. Therefore, in certain embodiments, when the ignition is switched on, the generation of a positive bias voltage is advantageous, with the result that the transient of the superposition of the voltages can be evaluated.

If it is determined that, despite an initiated switching process, that is to say the presence of a switching signal of the control device, no armature displacement is detected, a fault signal can be output and/or a longer voltage pulse can be output to the active, energized switching coil, in order to initiate the switching process again.

Furthermore, it is possible to monitor for unintentional switching in the quiescent mode, that is to say without the output of a switching signal of the control device. The monitoring can take place when the ignition is switched on but also when the ignition is switched off, that is to say both during travel and when the vehicle is parked. Since both switching coils are therefore not energized, both can also be used for the purpose of detection.

In various embodiments, during the monitoring of the quiescent mode or for unintentional switching, only the generator effect takes place. Like voltages induced in the two switching coils are generally opposed by the polarity or the sign; a negative pulse and a positive pulse therefore arise, which can optionally be evaluated. Therefore, the positive voltage pulse can be monitored, for example, directly, since the superposition of a positive bias voltage, which causes an additional power consumption on account, for example, of a voltage divider circuit and can discharge, for example, the vehicle battery when the ignition is switched off, is not necessary for an evaluation of the positive pulse.

It is therefore identified that the end stage or driver circuit for the switching coils may also be switched off and therefore have a high impedance for monitoring the quiescent mode since the positive pulse contains a certain energy that can accordingly be used to wake up the evaluation device without additional energy being required for the bias voltage or other devices. Therefore, continuous status monitoring of the quiescent mode that consumes power is not necessary either when the end-stage or control device is switched on or switched off. A wake-up signal activation signal or interrupt signal when input signal for a wake-up circuit and/or interrupt circuit can thus be formed directly from the positive voltage pulse.

In this case, both switching coils can be monitored, for example by virtue of them being given to separate inputs of the evaluation device (microprocessor) via a functional circuit, with the result that the direction of the unintentional armature displacement can also additionally be monitored so that the control device connected to the evaluation device can react immediately and can displace the armature back again to the correct position. In this case, the armature displacement is detected during the movement of the armature so that the counter reaction can be initiated very quickly and, in a fluid system such as, for example, an electropneumatic hand brake, the undesired rising pressure or change in pressure can therefore be stopped quickly before a dangerous situation arises.

The monitoring of the quiescent mode or the undesired switching both in the switched-on and switched-off state of the ignition is therefore possible, given a low power consumption with the advantage of external energy supply, for example, for waking up the evaluation device control device when the ignition is switched off.

The induced coil voltage can be evaluated qualitatively, for example, by evaluating the voltage level reached, for example through comparison (comparator) with a reference voltage. Furthermore, the period of the voltage pulse generated can also be checked in order to be able to determine erroneous temporary voltage peaks that are not associated with an armature position; furthermore, the polarity of the coil voltages indicates the direction of movement of the armature.

Therefore, particularly in the switched-off state of the control and evaluation device (ignition off, for example currentless state or quiescent mode), the positive pulse of the two switching coils can be recorded directly and used for wake-up and subsequent actuation; in the switched-on state (ignition on), an evaluation with bias voltage can advantageously take place, since a bias voltage is applied automatically to a voltage divider circuit, the evaluation of which for a negative pulse is advantageous.

In addition, the bias voltage can also be designed to be switchable so that it is switched on only in the presence of a switching signal. In principle, the bias voltage can also be diverted by the switching pulse or switching signal.

In addition to the evaluation of the non-energized switching coil, additional sensing windings, which generate a positive pulse directly, can be provided.

Therefore, in particular, a method for monitoring a bistable solenoid valve device is also specified, the method making possible reliable monitoring both for correct switching processes and quiescent mode, with little hardware outlay and the possibility of a rapid intervention or a rapid counter reaction.

The solenoid valve device as contemplated herein can be monitored, in certain embodiments, using the method as contemplated herein; the method as contemplated herein is provided, in certain embodiments, to monitor the solenoid valve device as contemplated herein.

Figure 1:
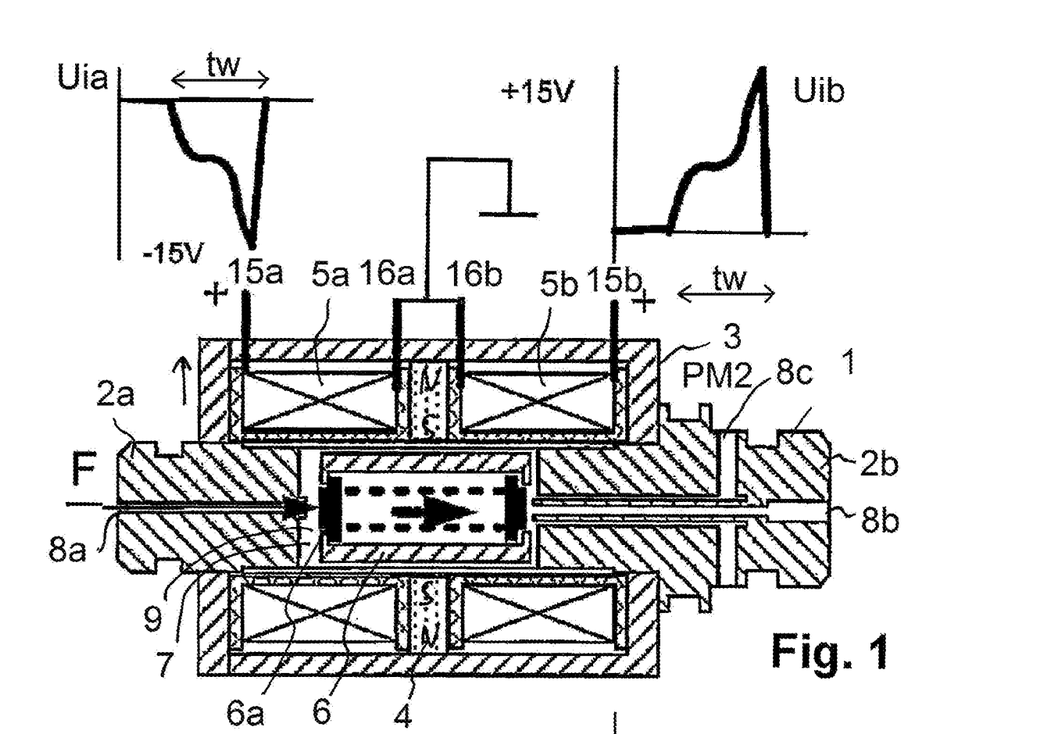
FIG. 1 shows a bistable solenoid valve device in accordance with a first embodiment in the case of an armature position owing to an external force with measurement of the generator effect.

FIG. 1 shows a bistable solenoid valve 1, which as an electropneumatic 2/2 valve comprising a first core 2a, second core 2b, a yoke 3, a permanent magnet 4, a first switching coil 5a and a second switching coil 5b, and also an armature 6 (core), which can be displaced in an armature clearance 7 and which can be displaced between a first armature position I and a second armature position II. The bistable solenoid valve 1 has three pneumatic connections, that is to say the valve is designed as an electropneumatic 3/2 valve, in this case comprising a first pneumatic connection 8a, a second pneumatic connection 8b and a third pneumatic connection 8c, which are connected to one another depending on armature position I or II. Therefore, for example in the left-hand armature position I of FIG. 1, the pneumatic connections 8b and 8c are connected to one another by employing the armature clearance 7 that is cleared by the armature 6 and the first pneumatic connection 8a is closed by the armature 6 or the left-hand armature seal 6a; in contrast, in the right-hand armature position II, the second pneumatic connection 8b is closed by the right-hand armature seal 8b, which is pressed further into the armature 6 so that the pneumatic connections 8a and 8c are connected to one another.

The cores 2a, 2b and the yoke 3 and the armature 6 or the cylindrical bushing thereof are made of a ferromagnetically conductive material, in certain embodiments iron; the permanent magnet 4 is permanently magnetized and formed in this case as a radial magnet, for example with a radially inner south pole S and a radially outer north pole N. In this case, the permanent magnet is therefore, in various embodiments, formed as a ring or perforated disk with radial magnetization. As an alternative thereto, however, radially arranged axial magnets, that is to say with the north and south pole following one another in the axial direction, can also be used.

Owing to the magnetic formation, without energization of the switching coils 5a and 5b, a bistable magnet formation is achieved in which the armature 6 is held in each of its two armature positions I and II; depending on the armature position, an air gap 9 is formed in the armature clearance 7, which is formed in the axial direction between the cores and 2a and 2b and which is larger in the axial direction than the armature 6: in the right-hand armature position II, the air gap 9 is therefore formed on the left, that is to say between the armature 6 and the (left-hand) first core 2a; accordingly, in the left-hand armature position I, the air gap 9 is formed in the right hand position, that is to say between the armature 6 and the right-hand core 2b; in each case, no air gaps are formed on the other side. The respective air gap 9 in this case weakens the left-hand or right-hand magnetic field significantly, with the result that the two armature positions I and II are stable.

The two switching coils 5a and 5b are provided to switch over between the armature positions I and II: when, for example, the left-hand switching coil 5a in the right-hand armature position II is energized, a first (left-hand) electromagnetic field EM1 is superposed on the first (left-hand) permanent magnetic field PM1 in such a way that the superposition of the magnetic fields PM1 and EM1 is more pronounced than the holding permanent magnetic field PM2, with the result that the armature 6 is displaced into the left-hand armature position I on account of the greater magnetic force, and conversely upon displacement from left to right owing to energization of the (right-hand) second switching coil 5b. The respectively other passive switching coil 5a, 5b is not energized.

In the case of the formation shown in FIG. 1, the switching coils 5a and 5b are therefore each energized by a positive coil connection 15a, b and a ground-connected negative coil connection 16a, b.

Figure 6:
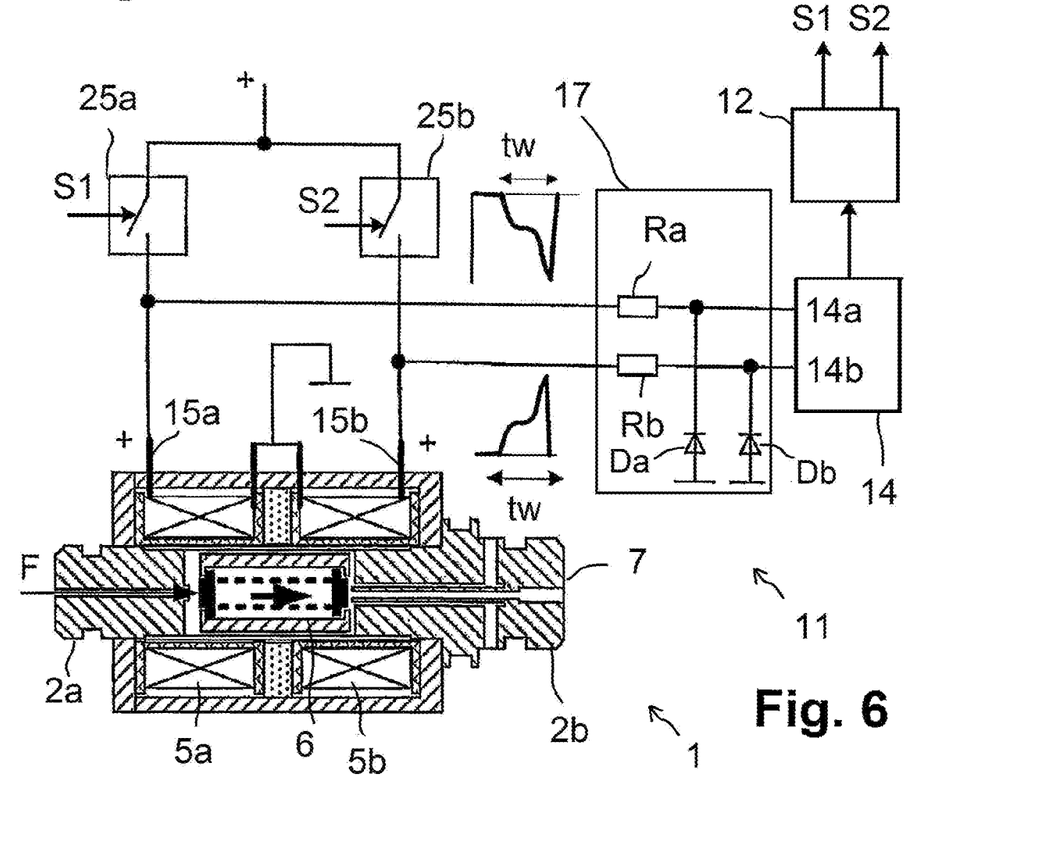
FIG. 6 shows a solenoid valve device comprising an evaluation circuit in the case of an active switching process in accordance with one embodiment.
Figure 7:
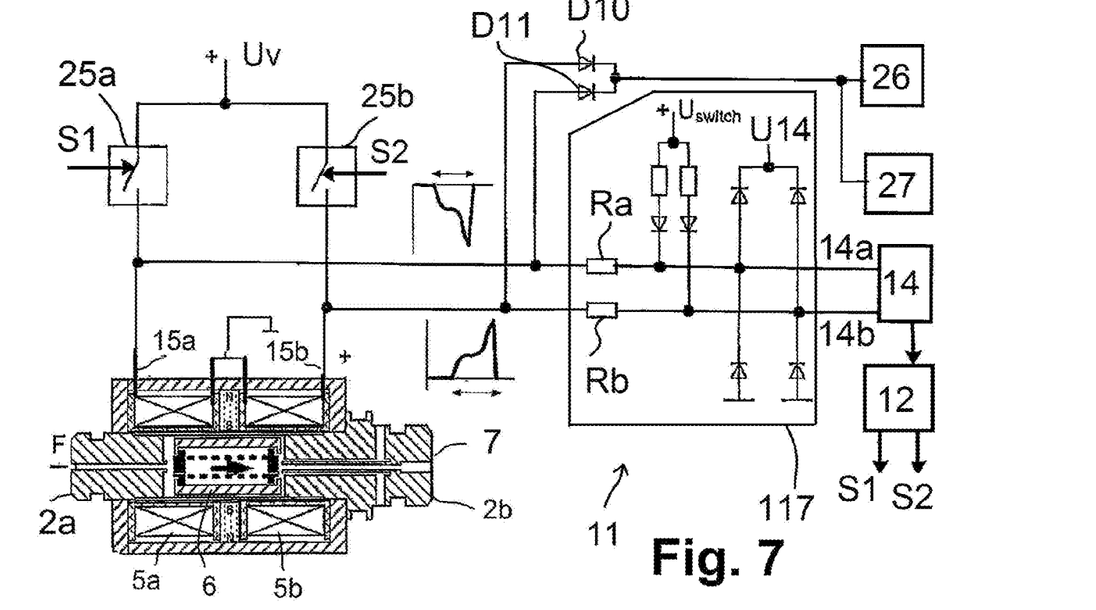
FIG. 7 shows a solenoid valve device comprising an evaluation circuit in accordance with a further embodiment.

The bistable solenoid valve 1 is accommodated in a bistable solenoid valve device 10, which has, in addition to the bistable solenoid valve 1, an end stage 11, in which a control device 12 and an evaluation device 14 are provided, which may also be formed in a combined manner; in accordance with different formations, functional circuits, for example resistors R1, R2, furthermore also a functional circuit 17 according to FIG. 6 or a functional circuit 117 according to FIG. 7, can be provided here for the purpose of setting an operating point, potential isolation and/or current limitation. The functional circuits 17, 117 of FIGS. 6 and 7 are provided to suppress negative voltages that can lead to destruction of components.

The bistable solenoid valve device 10 may be formed, in particular, in an electropneumatic parking brake system, that is to say as a switching valve of an electropneumatic parking brake, the device being held securely in the respective position, that is to say with the parking brake engaged or not engaged, according to the armature positions I and II, even without energization.

Figure 2:
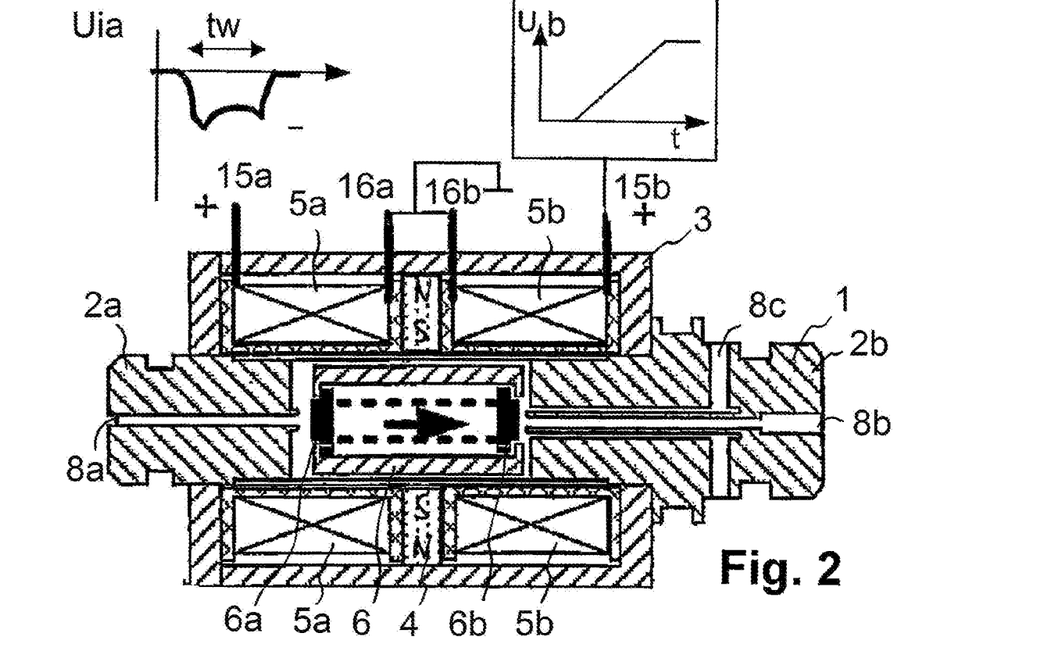
FIG. 2 shows the solenoid valve device from FIG. 1 when the armature is displaced by an electrical switching process with voltage ramp.
Figure 5:
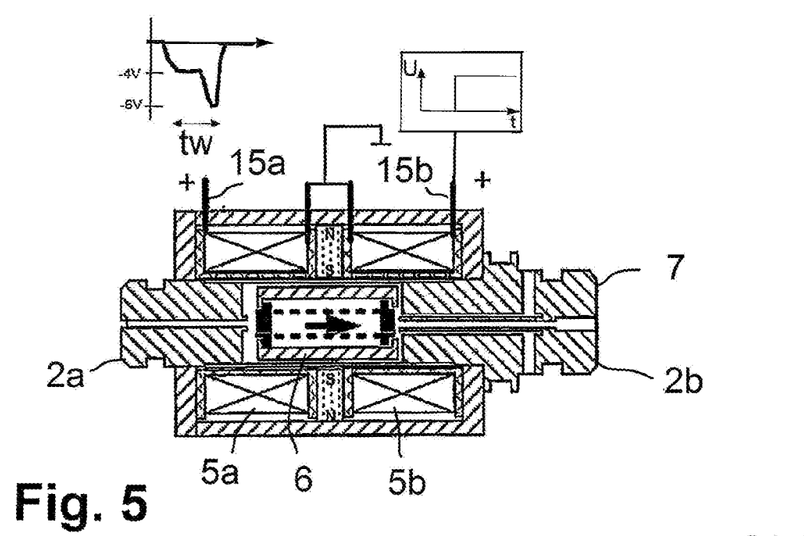
FIG. 5 shows the solenoid valve device in the case of a switching process with a voltage step, so as to form the generator effect and transformer effect.

For the purpose of switchover, in each case short electrical pulses are inputs to the positive coil connections 15a or 15b by employing a control device 12, for example by way of switching signals S1, S2; this can take place according to FIG. 2 by employing a ramp, that is to say slowly rising coil voltage, or by employing a square-wave pulse according to FIG. 5. The ramp can be provided, in certain embodiments, to keep the change in the current over time (temporal deviation di/dt) low, with the result that the transformer effect is kept low.

The evaluation device 14 serves to monitor the electrical behavior of the non-energized switching coil 5a and 5b, respectively, and to deduce a switching behavior, that is to say an armature movement of the armature 6, from the monitoring. In this case, in each case at least one induced coil voltage or an induced coil current, that is to say the first coil voltage UIa induced in the (left-hand) first switching coil 5a or the first coil voltage UIb induced in the (right-hand) second switching coil 5b is advantageously measured. The monitoring can take place as described below with reference to the figures both during a switching process and in a quiescent mode (quiescent state) or non-energized state: in the non-energized quiescent mode, it is the object of the bistable solenoid valve 1 to hold the respective armature position I or II. Owing to an external force, for example a mechanical shock, however, the armature 6 can be displaced as a mechanically displaceable part in the armature clearance 7, for example in the case of pronounced shaking or an impact on account of an uneven roadway or on account of vibration generated in the vehicle itself. The applied pneumatic pressures, which are controlled by the armature 6, can also support such displacements themselves since, in the armature clearance 7, they have an effect on the armature 6.

The induction of a coil voltage Uia or Uib is effected on account of one or both of the following physical effects:

Generator effect: the moving armature 6 is magnetized by the permanent magnetic fields PM1 and PM2 so that the armature moving between the armature positions I and II induces a respective current in the switching coils 5a and 5b; the armature 6 therefore constitutes in itself a (permanent) magnet, which causes a generator effect in the surrounding coils 5a and 5b on account of the movement of the armature. This is shown in FIG. 1: the armature 6 that moves, for example, from the left-hand armature position I into the right-hand armature position II induces the first coil voltage UIa as a voltage peak in the first switching coil 5a, and correspondingly the second coil voltage Uib in the right-hand switching coil 5b. Uia and Uib are offset from one another from their signs in accordance with the connections or the polarity since the switching coils 5a and 5b are connected in reverse to one another. In this case, generator voltages Uia and Uib of −15 volts and +15 volts, respectively, as illustrated in FIG. 1, can be formed here, the generator voltages generally being able to have the shown characteristic profile with a first rise, an upward arch or intermediate plateau and the subsequent voltage peak at, for example, +/−15 volts. The period tw can be, for example, 3 ms.

The control device 12, for example such as the hand brake control device, can therefore energise the first switching coil 5a and the second switching coil 5b in each case by employing the positive coil connection 15a and 15b thereof, for example in accordance with FIG. 6 by employing switches 25a, 25b for forming a square wave voltage, or by employing a ramp. The control device 12 may be formed, in combination with the evaluation device 14, as a control and evaluation device; as an alternative thereto, the evaluation device 14 and control device 12 can exchange signals.

Therefore, monitoring for unintentional switching between the armature positions I and II takes place in accordance with FIG. 1 in the quiescent mode, wherein the monitoring may take place while the ignition is switched on and also while the ignition is switched off.

During monitoring when the ignition is switched off, the induced coil voltage Uia, Uib generated by the generator effect can be used as an external energy supply and can wake up the control device 12, which is not active, for example is switched to a sleep mode or even switched off entirely, and/or evaluation device 14, which is not active.

To this end, a wake-up signal is formed to wake up or switch on the control device 12 and/or evaluation device 14.

In accordance with FIG. 1, in principle, the negative and/or the positive voltage pulse, generated on account of the generator effect, of the first and/or second coil voltage Uia, Uib can be used. In FIG. 1, Uia is negative, for example. In this case, the utilization of the positive voltage pulse, in this case therefore Uib, is advantageous since the generation of a positive bias voltage causes a certain power consumption and the vehicle battery is discharged as a result when the ignition is switched off.

The active switching coil can therefore be monitored since the associated end stage is switched off and is therefore inactive. The generator voltage pulse of the second coil voltage Uib is positive and contains the energy necessary to wake up the control device 12 as a wake-up signal, for example to switch on a switch (for example transistor), which disconnects the energy supply of the ECU from a permanent voltage terminal (terminal 30), or as an input signal of a wake-up input.

In accordance with FIGS. 6 and 7, the two induced coil voltages Uia and Uib of the two switching coils 5a and 5b can be input to separate inputs, that is to say a first measurement input 14a and a second measurement input 14b of the evaluation device 14. As a result, it is possible to evaluate the direction in which the armature 6 has unintentionally been moved so that the control device 12 can immediately react in such a way that it displaces the armature 6 again back into the previous armature position I or II, that is to say outputs a reset signal. The counter reaction can be initiated very quickly so that the undesired increasing pressure can be stopped by switching over the bistable solenoid valve 1 before a dangerous situation arises, that is to say before the hand brake is released or before the hand brake is engaged during travel.

For the purpose of switchover, the control device 12 therefore emits switching signals S1 or S2 to switching devices 25a, 25b, for example MOSFETs, which connect the positive coil connections 15a, 15b to the positive supply voltage.

In accordance with the embodiment of FIG. 6, the voltage measurement is effected in a high-impedance manner by measurement resistors Ra and Rb connected between the positive coil connections 15a, 15b and the measurement inputs 12a and 12b, the measurement resistors serving to decouple the voltage levels. In this case, diodes Da, Db, in various embodiments as Zener diodes, may be provided to prevent dangerous high positive voltage pulses and to prevent dangerous negative voltage pulses.

Furthermore, monitoring of the bistable solenoid valve device 10 for correct switching processes, that is to say correct switchover between the armature positions I and II is possible, that is to say switchover monitoring when the ignition is switched on.

Figure 8:
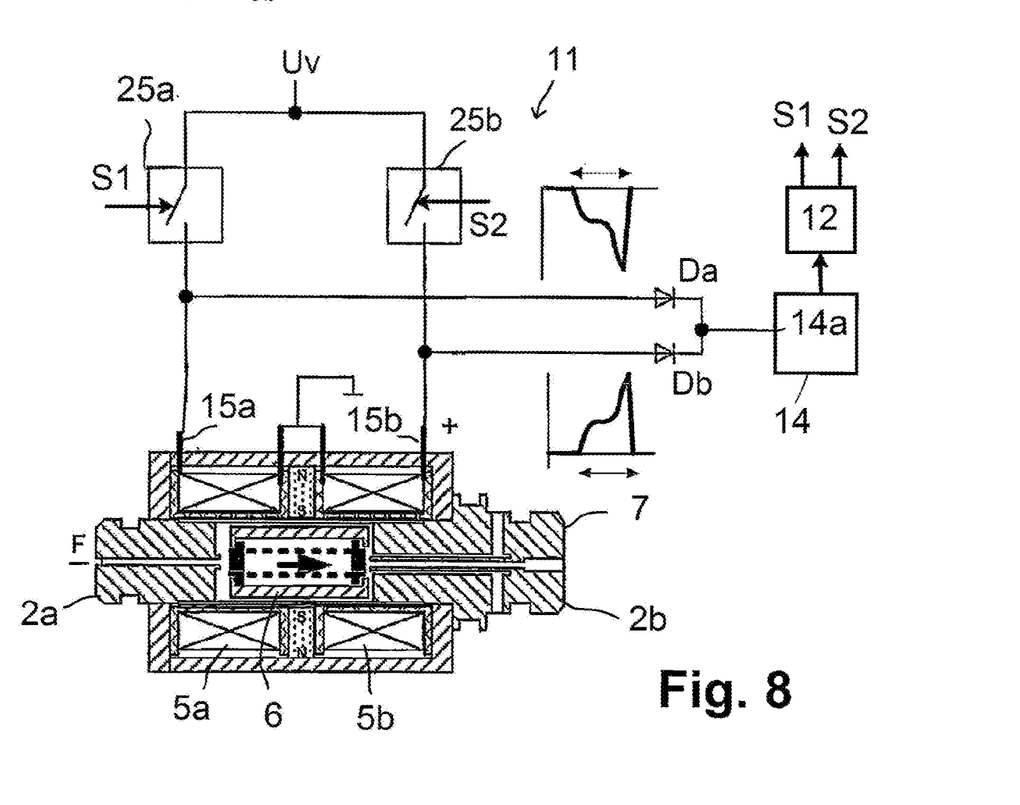
FIG. 8 shows a solenoid valve device comprising an evaluation circuit in accordance with a further embodiment for determining unintentional switching processes.

In accordance with FIGS. 6, 7 and 8, a switching coil 5a or 5b is energized by a switching signal S1 or S2 in order to move the armature into the respective other armature position II or I. The measurement is carried out here at the non-energized switching coil, which therefore serves as a sensor coil, to determine whether a switching process actually took place when the voltage pulse was applied.

In such switching processes, a negative voltage pulse Uia arises at the non-energized switching coil (center coil), for example switching coil 5a, the negative voltage pulse being induced by two physical effects.

On the one hand, as in the embodiment described above, the generator effect arises owing to the moving armature 6. The armature 6 itself is magnetized by the applied permanent magnetic fields PM1 and PM2 or part of the permanent magnetic fields, with the result that the moving armature 6 acts as a generator in the static switching coils, therefore in the passive switching coil 5b too.

Furthermore, as a second physical effect, the transformer effect arises, whereby the arrangement of the two switching coils 5a and 5b forms a transformer, which brings about a transformation of temporally changing coil currents again to coil voltages by employing a temporally changing magnetic flux. The energization of the second switching coil 5b leads to the formation of a magnetic flux of the second electromagnetic field EM2, the change in which over time again leads to the induction of a voltage pulse in the passive first switching coil 5a. In this case, the magnetic flux of the electromagnetic field also runs, for example, partly over the moving armature 6, with the result that the effects are superposed, furthermore also surrounds the two coils, for example over the entire yoke 3, so that the energization at one of the two switching coils 5a, 5b also always forms an induction in the passive switching coil owing to the formation of an electromagnetic field over the entire yoke 3 and the cores 2a, 2b and the armature 6.

Owing to the described ramp actuation, that is to say with a low di/dt or small change in current over time, the transformer effect, which is undesired in principle for the functional action of the valve, can be substantially suppressed.

This is illustrated in FIG. 2. If the armature 6 were to jam, the generator effect does not apply and owing to the low di/dt, that is to say the low change in current over time, only a negligibly low voltage is induced.

Such a determination of a correct switching process through discrimination by employing a comparison voltage level in this case constitutes the simplest checking option; in principle, the shape of the voltage pulse can also be checked, which may, however, be more complicated since the evaluation unit 14—as is conventional in motor vehicle technology—generally advantageously detects positive voltages or is not provided to evaluate negative voltage pulses. In order to nevertheless evaluate negative voltage pulses, a positive bias voltage Ubias can be superposed on (added to) the negative pulse formed at the sensing switching coil 5a by employing a suitable functional circuit 17, with the result that a voltage pulse is fed as a difference or reduction of the positive bias voltage to the evaluation device 14.

If no armature movement is detected, the control device 12 can react in a different way, for example can output a longer voltage pulse as the switching signal S2 to the second switching device 25b again in order to cause a displacement of the armature in this direction again, and/or can output a fault message.

Figure 3:
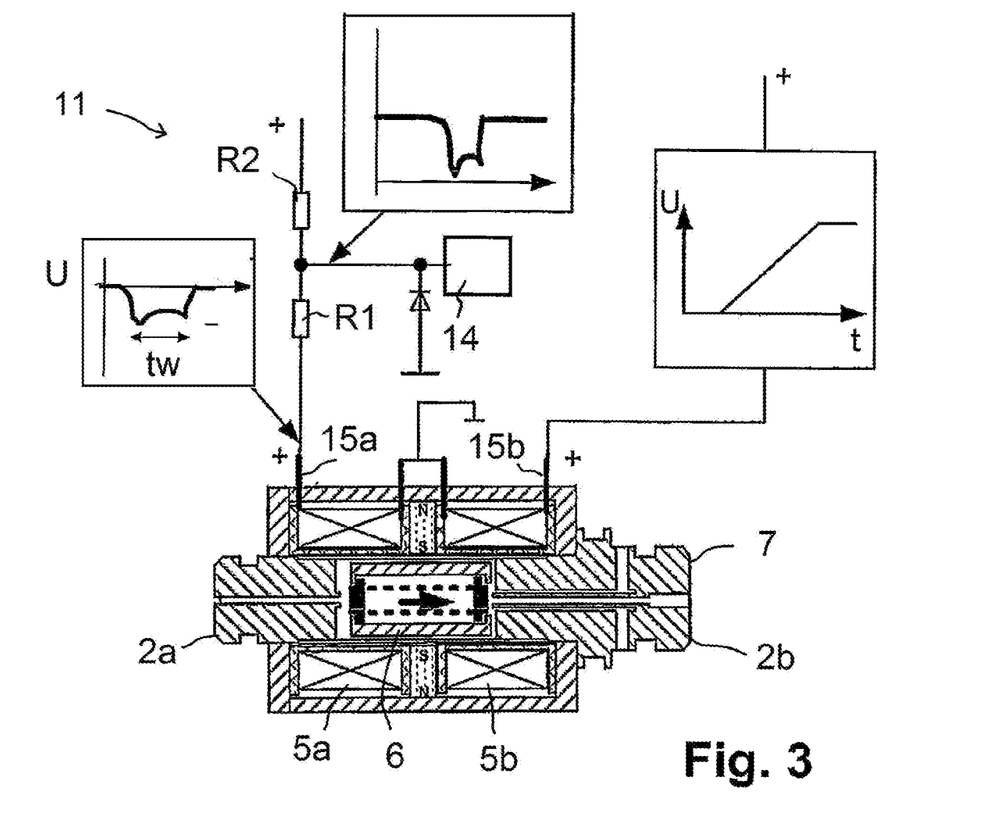
FIG. 3 shows an example of circuitry evaluation of the displacement process from FIG. 2.

FIG. 3 shows an embodiment of monitoring a switching process into the second armature position 2, that is to say with an active second switching coil 5b and a sensing first switching coil 5a, in which, again, the ramp shown in FIG. 2 is input as coil current and the coil voltage Uia drawn at the first positive coil connection 15a is decreased by employing a functional circuit, which has a voltage divider circuit comprising the resistors R1, R2, with respect to the supply voltage UV, with the result that the positive bias voltage generated by the voltage divider circuit is applied between the voltage divider resistors R1 and R2 since the first switching coil 5a has no current and is therefore situated at ground in a low-impedance manner Therefore, the bias voltage Ubias is generated, from which bias voltage the generated voltage pulse is accordingly negatively subtracted; the evaluation device 14 can accordingly evaluate the generated second (subsequent) measurement signal, wherein, in this case, a diode D1 is provided in turn as protection against excessively high voltage values and turns on in the case of an excessively high voltage value.

Figure 4:
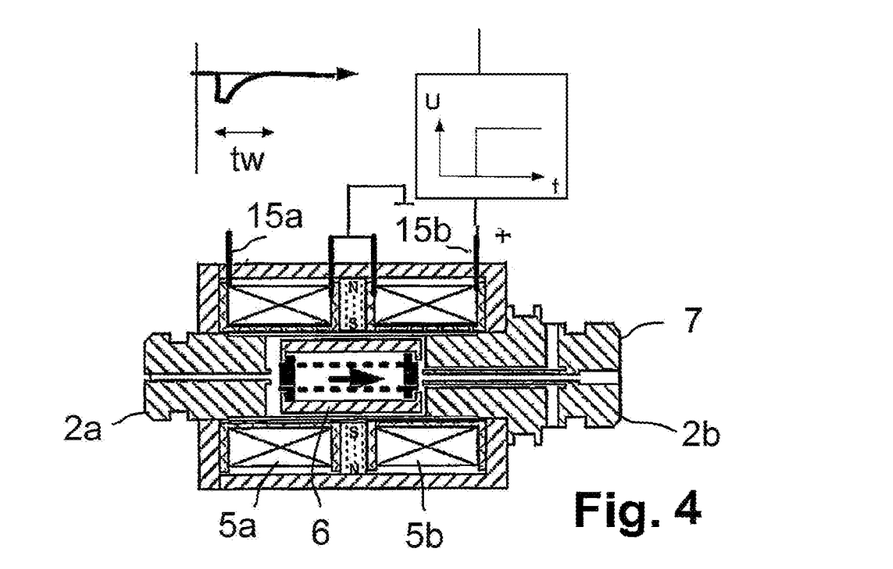
FIG. 4 shows the solenoid valve device in the case of electrical actuation according to FIGS. 2 and 3 without displacement of the armature.

In accordance with FIG. 4, an incorrect switching process, in which only the transformer effect therefore occurs, takes place since the armature 6 does not move since, for example, it is already in the second armature position II and can therefore no longer be displaced. In this case, minus Ubias, only a peak voltage of Uib=−2.5 V is therefore generated.

It is shown that the curves of FIG. 4 and FIG. 5 at the beginning are initially identical or similar since, in this case, initially the transformer effect is initiated; the generator effect then arises with the temporally moving armatures only in the second case of FIG. 5, with the result that, in this case, the peak becomes more pronounced (that is to say much greater), wherein, as described above, the actual generator effect can be superposed with a further transformer effect.

In accordance with FIG. 6, both coil connections 15a of the two switching coils 5a and 5b can therefore be connected to a measurement input 14a, 14b of the evaluation device 14, by way of a suitable functional circuit, for example the diodes Da, Db.

FIG. 7 shows an exemplary embodiment for evaluating the two voltage pulses. In accordance with FIG. 7, both switching voltages 5a and 5b are therefore evaluated for induced voltages in order to be able to carry out the two monitoring processes described above, that is to say the monitoring for unintentional switching of the quiescent mode and the monitoring for correct switching processes. In this case, a wake-up device 26 is provided, which records the positive pulse filtered out from the two induced coil voltages Uia and Uib by employing the diodes D10, D11; an IRQ device 27 is furthermore provided for generating an interrupt request IRQ, wherein the IRQ device 27 can be formed as an input at a microprocessor.

As already described with reference to FIG. 6, the two induced voltages Uia, Uib are furthermore fed to the measurement inputs 14a, 14b of the evaluation device 14, in accordance with the embodiment of FIG. 7 by employing protective diodes with respect to ground and with respect to the positive supply voltage Uv. Given a suitable dimensioning of the protective resistors Ra, Rb (measurement resistors), the diodes can also be omitted, if necessary. The positive bias voltage is fed via resistors and diodes.

In accordance with FIG. 8, the two positive coil connections 15a, 15b are fed via protective diodes Da and Db to a common measurement input 14a of the evaluation device 14, which can therefore measure in each case just one positive pulse; in this case only the generator effect, that is to say the unintentional switching in accordance with FIG. 1, can therefore be determined here.

LIST OF REFERENCE SIGNS (PART OF THE DESCRIPTION)

1 Bistable solenoid valve, for example pneumatic 3/2 solenoid valve
2a First core
2b Second core
3 Yoke
4 Permanent magnet
5a First switching coil
5b Second switching coil
6 Armature
6a First armature seal
6b Second armature seal
7 Armature clearance
8a First pneumatic connection
8b Second pneumatic connection
8c Third pneumatic connection
9 Air gap
10 Bistable solenoid valve device
11 End stage of the solenoid valve device 10
12 Control device
14 Evaluation device
14a First measurement input
14b Second measurement input
15a First positive coil connection of the first switching coil 5a
15b Second positive coil connection of the second switching coil 5b
16a Ground connection of the first switching coil 5a
16b Ground connection of the second switching coil 5b
17, 117 Functional circuit between coil connections and evaluation device 14
25a First switch device
25b Second switch device
26 Wake-up apparatus
27 IRQ device
I, II First armature position, second armature position
S1 First switching signal
S2 Second switching signal
Ra First measurement resistor
Rb Second measurement resistor
Da, Db Diodes
D10, D11 Diodes upstream of wake up apparatus 26
tw Period of the induced coil voltage Uia, Uib
Uia, Uib First, second induced coil voltage The terms "comprising" or "comprise" are used herein in their broadest sense to mean and encompass the notions of "including," "include," "consist(ing) essentially of," and "consist(ing) of." The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples. The term "about" as used herein serves to reasonably encompass or describe minor variations in numerical values measured by instrumental analysis or as a result of sample handling. Such minor variations may be in the order of ±0-25, ±0-10, ±0-5, or ±0-2.5, % of the numerical values. Further, The term "about" applies to both numerical values when associated with a range of values. Moreover, the term "about" may apply to numerical values even when not explicitly stated.

Generally, as used herein a hyphen "-" or dash "—" in a range of values is "to" or "through"; a ">" is "above" or "greater-than"; a "≥" is "at least" or "greater-than or equal to"; a "<" is "below" or "less-than"; and a "≤" is "at most" or "less-than or equal to." On an individual basis, each of the aforementioned applications for patent, patents, and/or patent application publications, is expressly incorporated herein by reference in its entirety in one or more non-limiting embodiments.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

The present invention has been described herein in an illustrative manner, and it is to be understood that the terminology which has been used is intended to be in the nature of words of description rather than of limitation. Many modifications and variations of the present invention are possible in light of the above teachings. The present invention may be practiced otherwise than as specifically described within the scope of the appended claims. The subject matter of all combinations of independent and dependent claims, both single and multiple dependent, is herein expressly contemplated.

What is claimed is:

1. A bistable solenoid valve device for a fluid system, wherein the bistable solenoid valve device comprises a bistable solenoid valve, the bistable solenoid valve comprising:
   a permanent magnet;
   an armature displaceable between a first armature position and a second armature position;
   a first switching coil for energization for a displacement of the armature into the first armature position;
   a second switching coil for energization for a displacement of the armature into the second armature position; and
   an evaluation device adapted to measure an induced coil voltage, an induced coil current, or both the induced coil voltage and the induced coil current, at one or more of the non-energized switching coils, and assess a switching behavior of the armature;
wherein, in a quiescent mode without a switching process of the armature, the evaluation device measures induced voltages of both non-energized switching coils, induced currents of both non-energized switching coils, or both induced voltages and induced currents of both non-energized switching coils.

2. The solenoid valve device as claimed in claim 1, wherein:
the bistable solenoid valve has a first core, a second core, and the armature comprises magnetically conductive material;
wherein when the armature is in the first armature position, the armature bears against the first core so as to form an air gap with respect to the second core, and
wherein when the armature is in the second armature position, the armature bears against the second core so as to form an air gap with respect to the first core.

3. The solenoid valve device as claimed in claim 1, wherein the evaluation device is connected to at least one coil connection of the switching coils, and records and evaluates the coil voltage induced in the one or more non-energized switching coils directly or by employing a functional circuit for setting an operating point or limiting a voltage a current, or both the voltage and the current.

4. The solenoid valve device as claimed in claim 1, wherein the evaluation device identifies a movement direction or switching direction of the armature from a polarity of the induced coil voltage, the induced coil current, or both the induced coil voltage and the induced coil current.

5. The solenoid valve device as claimed in claim 1, wherein the evaluation device is adapted to:
determine a period of the induced coil voltage, a level of the induced coil voltage, or both the period and the level of the induced coil voltage; and
assess the switching behavior from the determination.

6. The solenoid valve device as claimed in claim 5, wherein the period or the level of the induced coil voltage is determined through comparison with a reference voltage.

7. The solenoid valve device as claimed in claim 1, wherein the coil voltage induced in the case of an undesired armature movement is recorded by an activation device which outputs a wake-up signal, a fault signal, an interrupt signal, or combinations thereof.

8. The solenoid valve device as claimed in claim 7, wherein the activation device comprises a wake-up device, an interrupt device, or a combination thereof, and wherein the wake-up device forms from the induced coil voltage, without an additional supply of energy, an activation signal, or interrupt signal for switching on or activating the evaluation device situated in an inactive state, switching on or activating a control device, having a data link to the evaluation device, for switching the switching coils, or switching on or activating both the evaluation device and the control device.

9. The solenoid valve device as claimed in claim 1, wherein, in the case of a switching process of the armature actuated by a control signal or switching signal, the evaluation device measures and assesses the induced coil voltage at the non-energized switching coil, the induced coil current at the non-energized switching coil, or both the induced coil voltage and the induced coil current at the non-energized switching coil.

10. The solenoid valve device as claimed in claim 9, wherein, when an incorrect switching process is determined, the evaluation device outputs a fault signal to a control device that outputs the switching signal in order to repeat the switching process, outputs a reset signal in the case of undesired switching, or outputs both the switching signal and the reset signal.

11. The solenoid valve device as claimed in claim 1, wherein sensing windings are provided at the switching coils to form the induced coil voltages.

12. The solenoid valve device as claimed in claim 1, wherein the switching coils are formed in a joint yoke and form a first magnetic circuit together with the first core and the armature and also with the permanent magnet and a second magnetic circuit together with the second core, the armature and the permanent magnet, and wherein, in the armature positions, different fluid connections are connected to one another.

13. The solenoid valve device as claimed in claim 1, wherein the fluid system is further defined as a compressed-air system.

14. An electropneumatic parking brake comprising a bistable solenoid valve device according to claim 1, wherein the bistable solenoid valve device comprises three pneumatic connections and is displaceable between an air discharge position for discharging air from the parking brake and an air supply position for supplying air to the parking brake.

15. A bistable solenoid valve device for a fluid system, wherein the bistable solenoid valve device comprises a bistable solenoid valve, the bistable solenoid valve comprising:
a permanent magnet;
an armature displaceable between a first armature position and a second armature position;
a first switching coil for energization for a displacement of the armature into the first armature position;
a second switching coil for energization for a displacement of the armature into the second armature position; and
an evaluation device adapted to measure an induced coil voltage, an induced coil current, or both the induced coil voltage and the induced coil current, at one or more of the non-energized switching coils, and assess a switching behavior of the armature;
wherein, when an ignition is switched on, a positive bias voltage is superposed on a negative induced coil voltage in order to generate a positive output signal.

16. The solenoid valve device as claimed in claim 15, wherein the bias voltage can be switched and is switched on only when a switching signal for switching over the armature position is output.

17. A bistable solenoid valve device for a fluid system, wherein the bistable solenoid valve device comprises a bistable solenoid valve, the bistable solenoid valve comprising:
a permanent magnet;
an armature displaceable between a first armature position and a second armature position;
a first switching coil for energization for a displacement of the armature into the first armature position;
a second switching coil for energization for a displacement of the armature into the second armature position; and
an evaluation device adapted to measure an induced coil voltage, an induced coil current, or both the induced coil voltage and the induced coil current, at one or more of the non-energized switching coils, and assess a switching behavior of the armature, wherein:

in a switched-off state of the control device or when the ignition is switched off, the switching coils, the induced coil voltage, or both the switching coils and the induced coil voltage, are monitored for a positive voltage pulse; and in a switched-on state of the control device or when the ignition is switched on, a positive bias voltage is superposed onto the induced coil voltage by a functional device.

18. A method for monitoring a bistable solenoid valve device, the bistable solenoid valve device comprising an armature, and a first switching coil and a second switching coil for switching the armature into a first armature position or second armature position, the method comprising:

actuating a control device for a first switching process into the first armature position, to output a first switching signal wherein the second switching coil has zero current;

actuating the control device for a second switching process into the second armature position, to output a second switching signal for energizing a second switching coil wherein the first switching coil has zero current;

wherein, in a quiescent mode, the two switching coils are not energized;

monitoring, in each case, in a switching process, in the quiescent mode, or both the switching process and the quiescent mode, at least one non-energized switching coil for an induced coil current or induced coil voltage; and determining from the monitoring step whether there is a switching process present.

\* \* \* \* \*